United States Patent [19]

Fund et al.

[11] 3,961,541

[45] June 8, 1976

[54] BALL-EQUIPPED SCREW AND NUT MECHANISM

[75] Inventors: Jean Claude Fund, Bourdeau; Jacques Detraz, Chambery, both of France

[73] Assignee: La Technique Integrale S.A., Chambery, France

[22] Filed: Oct. 21, 1974

[21] Appl. No.: 516,497

[30] Foreign Application Priority Data
Oct. 30, 1973   France .............................. 73.38615

[52] U.S. Cl. ................................................. 74/459
[51] Int. Cl.² ........................................... F16H 55/22
[58] Field of Search ...................... 74/459, 424.8 R

[56] References Cited
UNITED STATES PATENTS

| | | |
|---|---|---|
| 2,851,897 | 9/1958 | Cochrane .............................. 74/459 |
| 2,945,392 | 7/1960 | Folkerts ................................ 74/459 |
| 3,176,535 | 4/1965 | Rowland ............................... 74/459 |
| 3,667,311 | 6/1972 | Wysong ........................... 74/424.8 R |
| 3,678,776 | 7/1972 | Patterson ............................. 74/459 |
| 3,771,382 | 11/1973 | Wilke .................................... 74/459 |

FOREIGN PATENTS OR APPLICATIONS

| | | | |
|---|---|---|---|
| 920,649 | 3/1963 | United Kingdom .................. 74/459 |

*Primary Examiner*—Leonard H. Gerin
*Attorney, Agent, or Firm*—Daniel M. Rosen

[57] ABSTRACT

A ball-equipped screw and nut mechanism for conversion of axial to rotary motion and the reverse, includes mating screw and nut members, with a plurality of balls in a helical, ball-recirculation channel, and a transfer component in said nut providing a portion of the recirculation channel.

8 Claims, 6 Drawing Figures

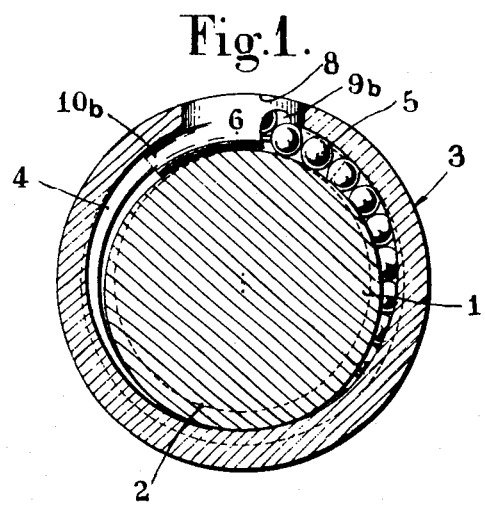
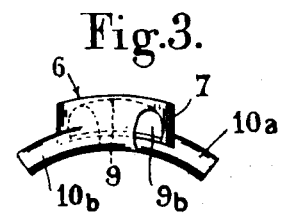
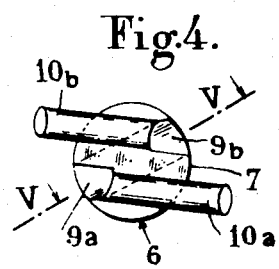
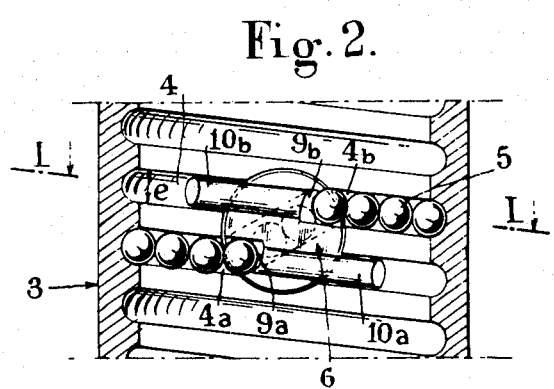
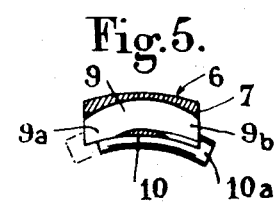
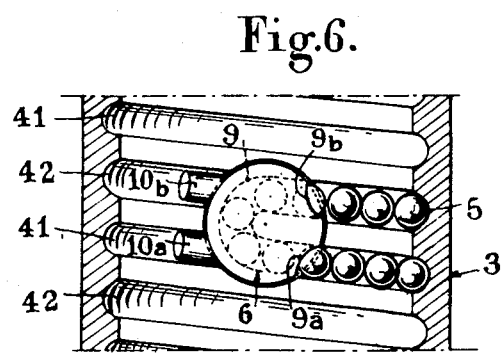

BALL-EQUIPPED SCREW AND NUT MECHANISM

BACKGROUND OF THE INVENTION

This invention relates to a ball-equipped screw and nut mechanism for the conversion of rotary motion into motion of translation, and the reverse conversion.

Mechanisms of this type are already known wherein the nut includes an added cylindrical component. This component includes an inside surface in contact with a thread of the screw, and adapted to transfer the balls from one end to the other end of a section of the same helical groove of the nut, passing over the screw thread so as to create a closed circuit for circulation of the balls. This known version of the mechanism however presents certain disadvantages. It is the inside surface, itself, of the added cylindrical component which provides a guide for the balls in their transfer from one end to the other of the helical groove section of the nut, even though, at the time of this transfer, the balls must roll in contact with the screw thread. The outside surface of the screw threads of the mechanisms of this kind is not generally buffed, and may frequently be irregular, particularly when the helical grooves of the screw have been adapted by embossing the metal. Consequently, transfer of the balls from one end to the other of the helical groove section of the nut is accompanied by friction, and potentially by heavy impact shocks, reducing the efficiency of the motion conversion mechanism, and causing it to function in a noisy manner. Moreover, in this known version, the cylindrical component is added to the outside surface of the nut, thereby making it necessary to provide a means to immobilize the cylindrical component in the radial direction. This complicates manufacture of the nut, and makes it more costly.

In another known version of a ball-equipped screw and nut mechanism of the type considered, the nut contains two openings of cylindrical or oblong shape, joined together by a slot adapted in the outer periphery of the nut, and in which two added components are engaged. These added components are adapted to transfer the balls from one end to the other of a single helical groove of the nut by means of a duct whose innermost wall consists of the bottom of said slot. In this version, the transfer of the balls between the ends of one section of a single helical groove of the nut is effected without material contact between said balls and the threads of the screw. However, machining the nut in this known mechanism is complicated and costly, due particularly to the necessity of adapting the shapes of the various openings, as well as to the added components. Moreover, since the axial transfer of the balls takes place near the outer surface of the nut, the latter must have substantial radial thickness, and consequently, substantial weight and bulk.

There is known, finally, a ball-equipped screw and nut mechanism of the type considered, which comprises, for transfer of the balls between the ends of one section of a single helical groove of the nut, an opening in the shape of an S, which is adapted in the lateral wall of said nut. In this opening there is immobilized, for example, by a welded plug, a tabular piece, likewise S-shaped, which serves to guide the balls over the screw thread, without contact with the thread. The manufacture of the nut of this known mechanism is therefore very complicated and costly.

It is thus an object of the invention to provide a novel and unique ball-equipped screw and nut mechanism which is less bulky, less complicated and less costly than prior such mechanisms.

SUMMARY OF THE INVENTION

This invention concerns a ball-equipped screw and nut mechanism for converting a rotary motion into a motion of translation, or the reverse conversion. The nut includes at least one added cylindrical component, which has an inside surface in contact with at least one thread of the screw, and which is adapted to transfer the balls from one end to the other of a section of the same helical groove of the nut, passing over the screw thread so as to create a closed circuit for the circulation of the balls. However, the added cylindrical component, with which the nut is provided, is designed not only to prevent any contact between the balls and the screw thread over which they are to be transferred, but is also designed in a way such as to simplify the manufacture of the nut and the respective cylindrical component, and thus to reduce substantially the cost of producing them.

The ball-equipped screw and nut mechanism according to this invention is of the latter type, and it is characterized by the fact that the component is of a cylindrical, flat shape, and is embedded in a cylindrical hole that extends substantially radially in the nut. This component contains an interior recirculation channel of closed transverse section, whose ends terminate respectively in the ends of the helical groove section of the nut and are provided with elements to guide the passage of the balls between said helical groove section and the aforesaid recirculation channel. This cylindrical component is provided laterally with at least one appendage of transverse shape and section, adapted to engage, with little play, between the respective helical grooves of the screw and the nut, so as to immobilize said cylindrical component in rotation and translation in the cylindrical hole of the nut.

In the case of the mechanism according to this invention, the housing of the added cylindrical component does not therefore require any more than the drilling of a cylindrical hole, substantially radial, in the nut. This is possible by a machining operation which is particularly simple and rapid. The added cylindrical component, moreover, is adapted so as to avoid any contact between the balls and the screw thread at the time of transfer of said balls. Since it is engaged in the substantially radial, cylindrical hole of the nut (before engagement of the nut on the screw), the added cylindrical component is immobilized there in translation by its own lateral appendage or appendages, without the need to make use of special means of attachment, such as a welded plug, a sleeve engaged above the screw. This results in a considerable simplification of the mechanism and of its manufacture. Finally, the lateral appendage, or appendages, likewise assure the immobilization in rotation of the cylindrical component engaged in the hole of the nut, without any further need to resort to independent means of immobilizing said cylindrical component.

According to another advantageous characteristic of the mechanism covered by this invention, the recirculation channel of the cylindrical component is only separated from the inside surface of said cylindrical component by a thin sheet of material. This arrangement permits a radial thickness of the nut of minimum value, slightly greater than the diameter of the balls.

In a preferred embodiment of the mechanism according to this invention, the cylindrical component comprises two lateral appendages which have, beneath the internal surface of said cylindrical component, extensions which extend, respectively, to near the ends of the recirculation channel, where said extensions are shaped into elements to guide the passage of the balls. In this preferred embodiment, the overall functions necessary to transfer the balls between the two extremeties of the helical groove section of the nut, is therefore accomplished by a single component.

BRIEF DESCRIPTION OF THE DRAWINGS

By way of example, there are described below and illustrated schematically in the attached drawings, several different embodiments of the mechanism according to this invention.

FIG. 1 is a cross-sectional view of a first embodiment of the invention, in a plane showing an added cylindrical component.

FIG. 2 is a partial sectional view, showing an internal surface area of the nut of the mechanism illustrated in FIG. 1, in which the added cylindrical component is located.

FIGS. 3 and 4 are elevation and plan views of the added cylindrical component of the mechanism illustrated in FIG. 1.

FIG. 5 is a sectional view taken along line V—V of FIG. 4.

FIG. 6 is a view, corresponding to FIG. 2, of the nut in another embodiment of the mechanism covered by this invention.

DETAILED DESCRIPTION OF THE PREFERRED EMBODIMENT

The embodiment of the ball-equipped screw and nut mechanism according to this invention, which is illustrated schematically in FIGS. 1 and 2, comprises essentially a screw 1, at least one of the ends of which can be coupled to a machine component, for example, to a lathe bed, by means of appropriate bearings. The lateral surface of this screw 1 is adapted with at least one helical groove 2, bounding at least one helical thread, as well as a nut 3, in the form of a cylindrical sleeve in the case of the version illustrated. The interior cylindrical surface of the nut has a diameter slightly greater than that of the thread of screw 1, and is itself slotted by the same number of helical grooves 4 as said screw 1. The helical grooves of screw 1 and of nut 3 have the same pitch and the same width e, (in FIG. 2, representing part of the nut). The helical grooves 2 and 4 of screw 1 and of the nut 3, respectively, define between them, when said nut 3 is applied to screw 1, at least one helical channel, in which balls 5, of diameter barely less than e, and with very slight play, are engaged. This arrangement will provide transmission of the forces between screw 1 and nut 3, in a manner known for this type of mechanism.

FIG. 2 corresponds to an area of the nut of the mechanism covered by this invention, in which there is created a closed circuit for the circulation of balls 5. The case illustrated represents one in which the screw 1 and nut 3 contain a single thread, and in which the axial extent of the closed circuit of the balls corresponds substantially to a thread pitch. Under these conditions, it is conceived that several closed circuits, for example two, can be provided in staggered positions along the common axis of screw 1 and nut 3, each one of these closed circuits having the following construction, which may be seen in FIGS. 1 and 2. In a section of the helical groove 4 of the nut (or of a single helical groove of the nut, if there is more than one), as well as the corresponding section of the helical groove of the screw, for one circuit, between the two ends 4a and 4b of this section of helical groove 4 of the nut, there is an added cylindrical transfer component 6, which, in the version considered, is constructed as shown in FIGS. 3 to 5.

In the embodiment considered, added component 6 presents a flat cylindrical body 7, which is embedded in hole 8, likewise cylindrical, drilled radially in nut 3, as is seen in FIGS. 1 and 2. Component 6, which is preferably made of case metal or synthetic material, has on the inside a ball recirculation or transfer channel 9 (see FIG. 5, particularly), whose two ends, 9a and 9b terminate, respectively, in the ends 4a and 4b of the helical groove section of the nut. It is to be noted, particularly in FIG. 5, that recirculation channel 9 of component 6 is only separated from the internal surface of component 6, which comes in contact with the thread of screw 1 when the latter is engaged in nut 3, by a thin sheet of material, 10. FIG. 5 shows clearly that the body 7 of component 6 can also have, in the radial direction of nut 3, a thickness slightly greater than the diameter of balls 5, which makes it possible to provide the mechanism according to this invention, with a nut of slight radial thickness, and consequently one of light weight and low cost. Although in FIG. 1, the thickness of body 7 of component 6 corresponds to the radial thickness of the nut, it is possible, without departing from the scope of the invention, to make use of a component 6 in which the thickness of body 7 is less than the radial thickness of the screw.

Added component 6, illustrated in FIGS. 3 to 5, is also provided laterally with two appendages, 10a and 10b, which are eccentric with respect to cylindrical body 7, and extend in opposite directions with respect to each other. Each one of the appendages, 10a and 10b, extends underneath internal surface 10 of body 7 of component 6, up to the near vicinity of ends 9a and 9b of recirculation channel 9. Extensions of lateral appendages 10a and 10b are shaped, near the ends 9a and 9b of recirculation channel 9, into elements to guide the passage of balls 5 between ends 4a and 4b of the helical groove section of the nut and the recirculation channel 9, itself. This guiding action of the extension of lateral appendage 10a is clearly visible in FIG. 2, wherein one of balls 5 is engaged in end 9a of recirculation channel 9. In addition, lateral appendages 10a and 10b of component 6, as well as their aforementioned extensions, have a transverse shape and section, adapted to engage with slight play in the corresponding helical grooves of screw 1 and nut 3, as is shown with particular clarity in FIG. 1, by lateral appendage 10b. By virtue of this arrangement, cylindrical component 6 is immobilized in rotation and translation in hole 8.

As a variation, the elongations of lateral appendages 10a and 10b of added component 6 can be eliminated, their guidance function with respect to balls 5 then being assumed by special elements, of suitable shape and position, which could be built into the internal surface body 7 of added component 6, or be built into the grooved inside surface of nut 3. This latter version, however, is less advantageous than the one earlier described. Nevertheless, in case special guiding elements are provided, a single one of the two lateral appendages 10a and 10b is sufficient to cause immobilization of added component 6 in rotation.

Although the embodiment of added component 6 illustrated in FIGS. 1 to 5 is particularly well adapted for mechanisms of the type considered, which have a relatively small advance (the advance being the relative axial displacement of the screw and the nut, corresponding to a relative rotation of 360° of these two components), the version of added component 6 shown in FIG. 6, is especially adapted to mechanisms of the type considered which have a relatively large advance. FIG. 6 represents schematically and partially, an embodiment of the nut of a mechanism according to this invention, in which the screw and nut each contain at least two helical grooves (41 and 42 for nut 3x), defining jointly at least two helical channels for the circulation of balls 5x. One of these helical channels (the one corresponding to groove 41) has a width barely greater than the diameter of balls 5x, and serving therefore for the transmission of force between the screw and the nut, while the other helical channel (the one corresponding to groove 42 of the nut) has a slightly greater width, in order to make possible the free recirculation of said balls 5x, as described in French Patent Application 72,37326, filed on Oct. 20, 1972, corresponding to U.S. Pat. No. 3,902,377, and assigned to the assignee of the present invention. In this case, the inside channel 9x of added component 6x, which is likewise engaged in a recessed hole of the inside surface of nut 3x, contains a semi-circular component in order to ensure, for example, the transfer of the balls from helical groove 41 of nut 3x into the wider helical groove 42 which provides for their recirculation. Two components such as 6x are provided near the two ends of nut 3x, respectively. In this version, the two lateral appendages 10c and 10d of added component 6x are located on the same side of said component, and they do not serve as guiding elements, a single one of said lateral appendages 10c and 10d being sufficient, moreover, to provide immobilization of component 6x in rotation.

In all of the cases, the lateral appendage or appendages of added component 6 or 6x can be adapted so as to constitute scrapers or cleaning means for cleaning the helical grooves of the screw. To this purpose, at least the ends of lateral appendages 10a and 10b (or 10c and 10d) can be provided with hair floss or other flexible material.

We claim:

1. In a ball-equipped screw and nut mechanism including a plurality of spherical balls and mating nut and screw members, wherein rotary motion of one of said members relative to the other causes axial motion of the other, the nut having an outer surface and helical groove in its inner surface, the screw having a complemental groove in its outer surface, said grooves cooperating to define a helical channel of substantially circular cross-section in which said balls circulate, the improvement in combination therewith wherein said nut includes a hole extending generally radially outward from its inside surface to its outer surface, a transfer component comprising a body part which is cylindrical and conforms to and is positioned in said hole in the nut, said body part having length in the axial direction of the screw corresponding to one pitch length between two adjacent grooves of said helical channel and defines therein a transfer passage extending between and communicating with said adjacent grooves, said transfer component further comprising at least one appendage extending transversely from said body part in a circumferential direction into and engaging a portion of said helical channel for immobilizing said component in rotation and translation, and guide means extending from said body part into said helical channel for deflecting balls from the helical channel into said transfer passage.

2. A device according to claim 1 wherein said hold and said body part are circular in cross-section and coaxial, and said appendage extends transversely of said axis of said body part.

3. A device according to claim 1 further comprising a second appendage similar to the first, said first and second appendages spaced apart and respectively engaging said adjacent grooves of said helical channel.

4. A mechanism according to claim 3 wherein said appendages extend in opposite directions in said grooves.

5. A mechanism according to claim 3 wherein said appendages extend in the same direction and are spaced apart a distance corresponding to the pitch of said helical channel.

6. A mechanism according to claim 1 wherein said appendage comprises cleaning means for scraping the helical groove of said screw member.

7. In a ball-equipped screw and nut mechanism including a plurality of spherical balls, mating nut and screw members, wherein rotary motion of one of said members relative to the other causes axial motion of the other, the nut having an outer surface and a helical groove in its inner surface, the screw having a complemental groove in its outer surface, said grooves cooperating to define a helical channel of substantially circular cross-section in which said balls circulate, the improvement in combination therewith wherein said nut includes a hole extending generally radially outward from its inside surface to its outer surface, the improvement comprising a transfer component which defines therein a transfer channel for said balls to pass therethrough, said component being insertable in said hole, with said transfer channel extending between and connecting two adjacent threads of said helical channel, said component further comprising at least one appendage extending from one end of said transfer channel for engaging said helical channel and thereby immobilizing said component in rotation and translation, and guide means for guiding said balls between said transfer and helical channel, said appendage further comprising hair floss cleaning means for scraping said channel into which said appendage extends.

8. In a ball-equipped screw and nut mechanism including a plurality of spherical balls, mating nut and screw members, wherein rotary motion of one of said members relative to the other causes axial motion of the other, the nut having an outer surface and a helical groove in its inner surface, the screw having a complemental groove in its outer surface, said grooves cooperating to define a helical channel of substantially circular cross-section in which said balls circulate, the improvement in combination therewith wherein said nut includes a hole extending generally radially outward from its inside surface to its outer surface, the improvement comprising a transfer component which defines therein a transfer channel for said balls to pass therethrough, said transfer channel being bounded on the radially inward side by only a thin sheet of material, said component being insertable in said hole, with said transfer channel extending between and connecting two adjacent threads of said helical channel, said component further comprising at least one appendage extending from one end of said transfer channel for engaging said helical channel and thereby immobilizing said component in rotation and translation, and guide means for guiding said balls between said transfer and helical channel.

* * * * *